J. H. MORRELL.
Water-Trap Supply and Connection.
No. 168,405. Patented Oct. 5, 1875.
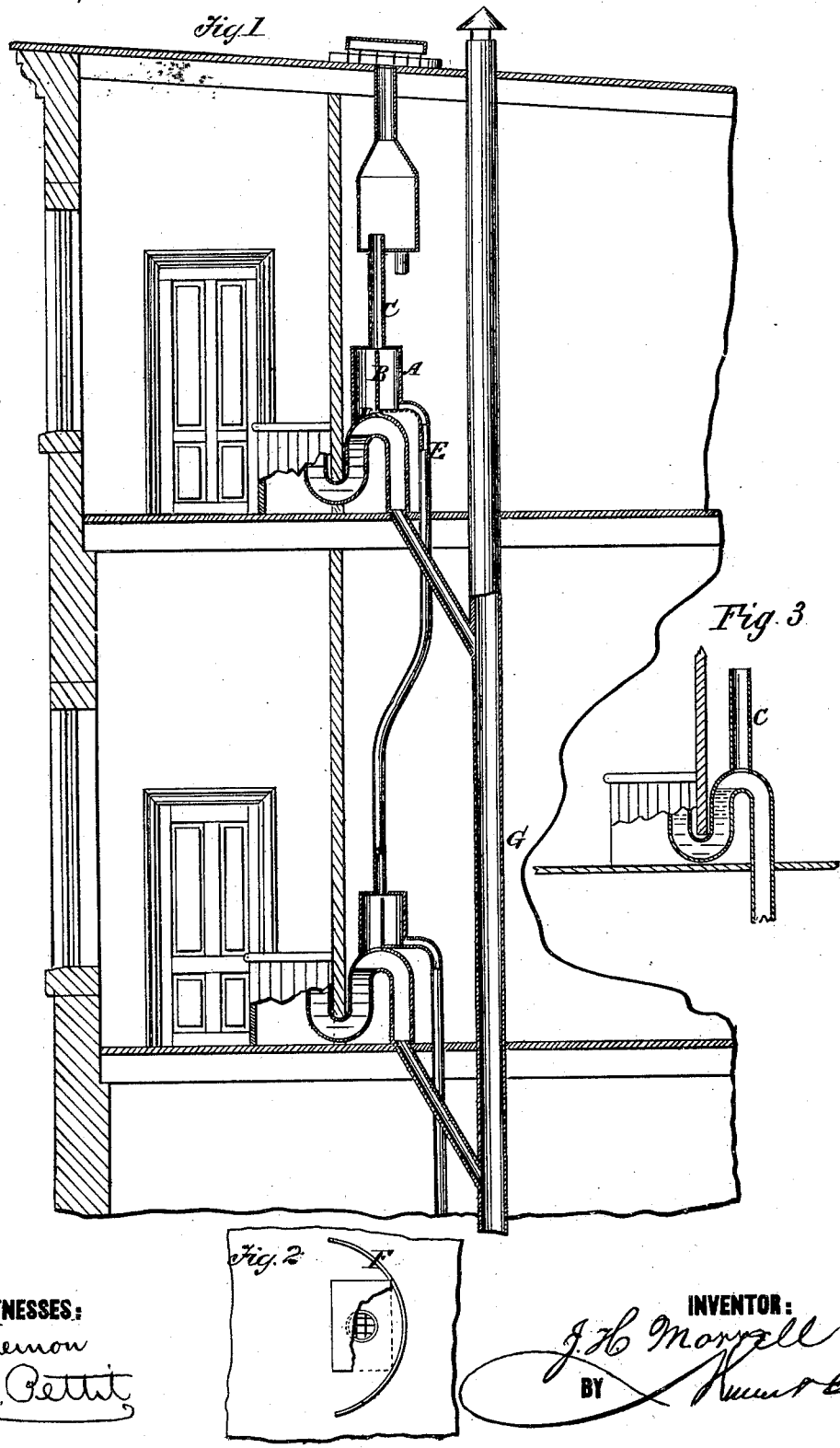

UNITED STATES PATENT OFFICE.

JOHN H. MORRELL, OF NEW YORK, N. Y.

IMPROVEMENT IN WATER-TRAP SUPPLIES AND CONNECTIONS.

Specification forming part of Letters Patent No. 168,405, dated October 5, 1875; application filed September 23, 1875.

*To all whom it may concern:*

Be it known that I, JOHN H. MORRELL, of the city, county, and State of New York, have invented a new and Improved Water-Trap Supply and Connection; and I do hereby declare that the following is a full, clear, and exact description of the same, reference being had to the accompanying drawing, forming a part of this specification, in which—

Figure 1 represents a sectional elevation of a building, showing my invention as applied. Fig. 2 is a detail view, showing plan for collecting water on the roof. Fig. 3 shows a single trap connected directly with the pipe from the roof.

Similar letters of reference indicate corresponding parts.

The object of this invention is to provide a means of conducting water from the eaves-trough or roof of the building to a succession of traps, so as to keep them charged with fresh water with each fall of rain, which will also insure the pipes being kept clean and sweet. The pipes forming the connection between the traps, being unobstructed, will also form a perfect system of ventilation. It will thus be seen that, whether the house is occupied or unoccupied, the traps will be recharged automatically, and thereby save the expense of employing a person to enter the house periodically for such purpose, and who, through carelessness or oversight, might omit one or more traps, or possibly leave the house unlocked.

The construction and operation of my invention are described as follows:

In the case here presented, I have a small reservoir, A, located on the rise of each water-trap, the said reservoir being formed by a partition, B, which extends upward to the throat of the pipe C, so as to divide it centrally, and thereby cause such water as may flow down the pipe to be divided—that is to say, part of the water to flow directly into the first trap through an opening, D, in its top made for such purpose, and the remainder of the water being caught in the reservoir A flows through the pipe E down to the second trap through a reservoir arranged in similar manner, and so on down to the sewer or drain, and in most cases I am able to dispense with the trap at the sewer or drain.

It will thus be seen that while I form a perfect arrangement for the supply of any number of traps, I maintain a perfect ventilation from the sewer or drain up to the roof of the building.

In cases where I do not connect with the eaves-trough to take my supply of water therefrom, I have provided a means whereby I am enabled to tap the roof at any desired point, and collect a sufficient quantity of rain-water to accomplish the desired result, by having a semicircular or other shaped ridge, F, nailed or otherwise secured to the roof, as shown in Fig. 2, which will lead the water to and retard the same over the top of pipe, so as to insure a sufficient quantity being collected from every shower.

In the drawing I have shown the main pipe G from the sewer or drain running up through the roof of the building; but in most cases the said pipe need not extend above the line of the trap on the upper story of the building, as the ventilation may be completed through the upper trap and pipe leading to the roof therefrom, and thereby save the expense of the length of main pipe through the upper story.

In some cases, when the pipes would be subject to extreme heat or cold, I propose to cover the same with a second pipe or sheathing.

Having thus described the arrangement of my devices as applied to a number of traps, I would have it understood that I do not confine my invention to the particular construction of the reservoir in combination with the trap and pipe leading from the roof, for in cases where there is but a single trap, the pipe conducting the water from the roof may be attached directly to the rise of the same to produce the same result, the bend in the trap serving to effect the division of the water, and yet allow a perfect ventilation.

Having thus described my invention, what I claim as new is—

1. The combination, with the water-trap and a pipe receiving water from the roof, of a reservoir or chamber, having a partition, B, an opening, D, for the trap-supply, and a pipe, E, communicating with the lower traps, as and for the purpose described.

2. The combination, with a water-trap, of a pipe receiving water from the roof, and attached to the upper bend or rise of the trap in the middle, so as to deliver part of its water into the trap, and part into the outlet-pipe, and yet preserve a perfect ventilation, substantially as described.

JNO. H. MORRELL.

Witnesses:
CHARLES H. NASH,
JAMES H. HUNTER.